Figure 1:
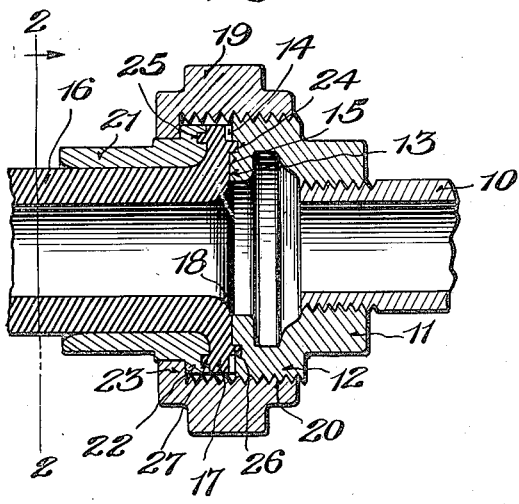

Oct. 21, 1924.

P. MUELLER

PIPE COUPLING

Filed Nov. 12, 1919

1,512,298

Witness
Chas. L. Griesbauer

Inventor
Philip Mueller,
By
Attorneys

Patented Oct. 21, 1924.

1,512,298

UNITED STATES PATENT OFFICE.

PHILIP MUELLER, OF DECATUR, ILLINOIS, ASSIGNOR TO ADOLPH MUELLER, TRUSTEE, OF DECATUR, ILLINOIS.

PIPE COUPLING.

Application filed November 12, 1919. Serial No. 337,489.

*To all whom it may concern:*

Be it known that I, PHILIP MUELLER, a citizen of the United States, residing at Decatur, in the county of Macon and State of Illinois, have invented new and useful Improvements in Pipe Couplings, of which the following is a specification.

This invention relates to pipe couplings and has particular reference to that class of pipe couplings employed in connecting relatively soft and hard pipes.

Heretofore great difficulty has been encountered in maintaining a water tight connection between a relatively soft or malleable member and a relatively hard and unyielding member, the most common example being that of a lead pipe connected to a harder one such as iron or the like. Difficulty has been encountered not only in maintaining a water tight connection but also in the provision of adequate means for retaining the abutting ends of the pipe sections in co-axial alinement, with respect to each other, when an undue lateral pressure is exerted accidently, or otherwise, upon the pipe line, and particularly when such force is exerted relatively near the coupling connecting the abutting ends of the pipe. Furthermore it has been found difficult to provide a simple and effective means for preventing the abutting ends of the pipes from rotating with respect to each other as a result of a rotating force exerted upon the coupling for the purpose of drawing the ends of the pipes into close contact to afford as nearly as possible a perfect seal or water tight connection therebetween.

The prior art discloses various means which have been devised for overcoming in a single coupling the difficulties above pointed out. The means heretofore employed to produce as nearly as possible a water tight joint consists generally, as shown by the prior art, in the provision of an annular groove formed upon the abutting end of the harder pipe, within which is molded a portion of the softer pipe resulting from the bringing together in an intimate end to end relation the abutting ends of the pipes. The above named means, briefly described, has been employed incidentally as a means for retaining the united pipes in axial alinement with respect to each other when intimately joined together by the conventional type of coupling nut. The means employed for preventing a relative turning of one pipe with respect to the other when being coupled, consists generally, as shown by the prior art, in the provision of a plurality of walls formed upon the face of the harder member relatively near the opening therein together with a sleeve encircling the abutting end of the softer pipe and co-operating with a screw-threaded annular member employed as a means for bringing the abutting ends of the pipes into an intimate end to end relation.

The specific means employed in maintaining the water tight connection has been found defective in that, as a result of the particular disposition of the walls provided on the abutting end of the harder member, the utilization of a maximum area of the flat contacting faces of the abutting ends of the pipes is made impossible. The second named means has been found defective in that, because of the relatively small area of the smooth contacting face, the provision of a sufficient number of grooves, so disposed with respect to each other as to produce the most efficient result, is made impossible. The means employed as disclosed by the prior art, to prevent the rotation of one member with respect to the other when the coupling is being assembled has been found defective in that, because of the specific location of the walls formed upon the abutting end of the harder pipe, the maximum resistance thereof is rendered inavailable.

It is the object of this invention to overcome all of the above noted objections and disadvantages found in couplings heretofore invented and used and at the same time provide a coupling which is compact in structure and inexpensive to manufacture.

Other objects and advantages of the invention will be apparent during the course of the following description taken in connection with the accompanying drawings.

Figure 2:
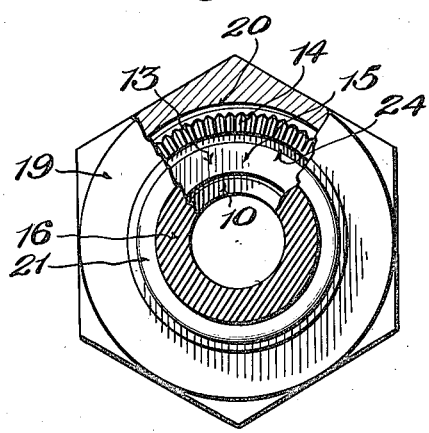
Figure 3:
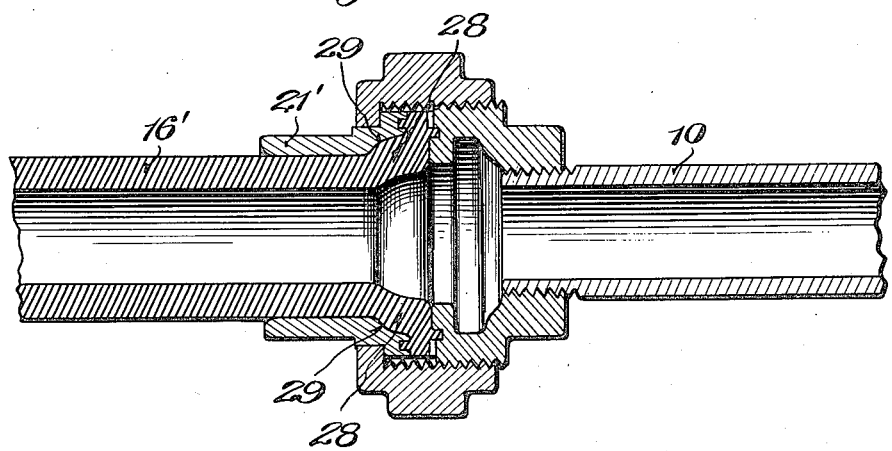

In the drawings, forming a part of this specification and in which like numerals are employed to designate like parts throughout the same, Figure 1 is a central longitudinal sectional view through the coupling embodying the preferred form of my invention, Figure 2 is a transverse sectional view taken on line 2—2 of Figure 1, and, Figure 3 is a longitudinal sectional view through a coupling embodying a modified form of my invention.

In the drawings, attention being called to Figures 1 and 2, wherein is shown the preferred form of my invention the numeral 10 indicates a pipe having screw-thread or other suitable engagement with a spud 11 which is formed with an externally screw-threaded flange 12, the outer diameter of which is substantially larger than that of the pipe 10 while the inner diameter is only slightly larger than the diameter of the pipe 10. Because of the appreciable difference in the length of the inner and outer diameters of the flange 12 the provision of an abutting face 13 having a relatively large area is made possible. Upon the face 13 at the outer edges thereof there is provided a plurality of corrugations 14 which are arranged in an annular group and project an appreciable distance above the plane of the smooth portion 15 of the face 13, which portion will hereinafter be referred to as a contact face. I prefer to form the corrugations relatively short in length in order that the largest possible area of the contact face 15 may remain a smooth surface. I further desire to arrange the corrugations 14 at the peripheral edge of the face 13, rather than at the inner edge, in order that the maximum resistance may be rendered available to resist any rotative force accidentally or otherwise applied to the pipe 10 tending to rotate the same particularly when the coupling is being assembled.

In axial alinement with the pipe 10 there is arranged a pipe 16, formed from a relatively soft metal, such as lead, which pipe is provided with a flange 17 having a face 18 retained in engagement with the face 13 of the spud 11 by means of a coupling nut 19 having screw-thread engagement with the spud as shown at 20. Upon the end of the pipe 16 there is disposed a sleeve 21 which is provided with a flange 22 confined between the flange 17 of the pipe 16 and a flange 23 carried by the coupling nut 19. Upon the faces of the flanges 12 and 22 there is provided annular grooves 24 and 25, respectively, within which grooves portions of the flange 17 are molded as clearly shown in Figure 1, thereby forming annular beads 26 and 27 when the face 18 of the pipe 16 is drawn, by means of coupling nut 19, into intimate relation with the face 13 of the spud 11.

In considering Figure 3 wherein is shown a modified form of my invention it will be noted that the pipes 16' and the sleeve 21' are the only elements which have been materially changed. The pipe 16' adjacent the flange 17 has been thickened to provide a reinforcing portion 28 which necessitates the provision of a recess 29 within the sleeve 21' to accommodate the reinforced portion. The modification herein shown is made primarily for the purpose of overcoming any reasonable probability of the separation of the pipes 10 and 16' due to any longitudinal thrust or pull in opposite directions which may be accidentally or otherwise exerted thereupon. In order to effect a separation of the pipes 10 and 16' when the coupling is assembled as shown in Figure 3 it will be necessary to strip or shear not only the annular ribs 24 and 25 together with the flange 17 but also the reinforcing portion 28.

It is apparent from the drawings and the description relative thereto that the construction which I employ by reason of the fact that a contact face having a relatively large area together with a plurality of annular ribs is employed makes possible the forming of a water tight connection between the coupled pipes. It is further apparent that because of the plurality of ribs 24 and 25 the abutting pipes are at all times retained in an axial alinement with respect to each other, they serving as a means not only to prevent the escape of water or other liquid through the coupling but also as a means for reinforcing the structure as a whole should any undue lateral force be applied to one or the other of the pipes. By arranging the corrugations 14 at the outer edge of the face 13 rather than adjacent the opening of the spud a maximum resistance thereof is rendered available to prevent a relative turning of one pipe with respect to the other particularly when the coupling is being assembled.

While I have shown a lead pipe coupled to a harder one by use of the coupling embodying my invention, it is obvious that the invention may be equally as well employed in uniting pipes formed from other metals. Furthermore, it is apparent that the coupling is adapted to be used in connecting various elements other than those which I have shown, for example, should it be desired, the coupling embodying my invention might be used for coupling a lead pipe to a corporation cock formed from a harder metal or if so desired by the use of my invention a corporation cock or other element formed from a relatively soft metal such as lead may be connected with a pipe formed from a relatively hard metal such as iron.

I claim:

1. A coupling comprising a pipe, a spud having its abutting end formed with a plurality of corrugations arranged adjacent its outer edge, a relatively large smooth contact face adjacent its inner edge, and a coupling nut for drawing said pipe into intimate engagement with said contact face and corrugations.

2. A coupling comprising a pipe, a spud having its abutting end formed with a plurality of corrugations arranged adjacent its outer edge, a relatively large smooth contact face adjacent its inner edge, an annular groove separating said contact face from said corrugations, and a coupling nut for drawing said pipe into intimate engagement with said contact face and corrugations.

3. A coupling comprising a pipe, a spud having its abutting end formed with a plurality of corrugations arranged adjacent its outer edge, a smooth contact face adjacent its inner edge of wider area than said corrugations, an annular groove separating said contact face from said corrugations, and a coupling nut for drawing said pipe into intimate engagement with said contact face and corrugations.

4. A coupling comprising a pipe, a sleeve provided with a groove; on said pipe, a spud having a smooth contact surface adjacent the opening thereof; a plurality of corrugations encircling the contact surface; an annular groove separating said contact surface and said corrugations; a coupling nut for drawing the contact surface and corrugations of said sleeve against said pipe, whereby said corrugations will be embedded in said pipe and portions of said pipe will be molded into said grooves.

5. A coupling comprising a pipe, and provided with a groove sleeve on said pipe; a spud having a smooth contact surface adjacent the opening thereof; a plurality of radially disposed corrugations encircling the contact surface; an annular groove separating said contact surface from said corrugations, said corrugations extending an appreciable distance beyond the plane of the contact surface; a coupling nut for drawing said sleeve, contact surface and corrugations into intimate engagement with said pipe whereby said corrugations will be embedded in said pipe and portions of said pipe will be molded into said grooves.

6. A coupling for pipe sections comprising a spud removably connected to one of said pipe sections and having its abutting face provided with a smooth contact surface adjacent its inner periphery and a plurality of short corrugations contiguous its outer periphery, an annular groove separating said corrugations from said contact surface, the other of said pipe sections having an end flange adapted to abut said spud, a sleeve engaging a flange on the other pipe section and having an annular groove, and a coupling nut for drawing said sleeve and spud into intimate engagement, whereby portions of one of the pipe sections is molded into said grooves.

In testimony whereof I have hereunto set my hand.

PHILIP MUELLER.